(12) United States Patent
Ogawa et al.

(10) Patent No.: US 11,181,157 B2
(45) Date of Patent: Nov. 23, 2021

(54) BRAKE DUST COVER

(71) Applicant: TOYOTA JIDOSHA KABUSHIKI KAISHA, Toyota (JP)

(72) Inventors: Takahiro Ogawa, Okazaki (JP); Tetsuya Fujimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 16/571,784

(22) Filed: Sep. 16, 2019

(65) Prior Publication Data

US 2020/0116221 A1 Apr. 16, 2020

(30) Foreign Application Priority Data

Oct. 10, 2018 (JP) .............................. JP2018-191646

(51) Int. Cl.
*F16D 65/00* (2006.01)
*F16D 55/00* (2006.01)

(52) U.S. Cl.
CPC ......... *F16D 65/0081* (2013.01); *F16D 55/00* (2013.01); *F16D 2055/0037* (2013.01)

(58) Field of Classification Search
CPC .................... F16D 65/0081; F16D 2055/0037
USPC .................................................. 188/218 A
See application file for complete search history.

(56) References Cited

U.S. PATENT DOCUMENTS

| 4,155,601 A * | 5/1979 | Ito ............................. B60B 7/00 188/218 A |
| 4,313,528 A * | 2/1982 | Ito ........................... B60T 1/065 188/218 A |
| 7,341,130 B2 * | 3/2008 | Samuelsson ............ F16D 55/00 188/218 A |
| 2018/0010654 A1 * | 1/2018 | Jimbo ..................... F16D 55/00 |
| 2018/0094684 A1 | 4/2018 | Kobayashi et al. |
| 2020/0116221 A1 * | 4/2020 | Ogawa .................... F16D 55/00 |

FOREIGN PATENT DOCUMENTS

| JP | 2017-082889 A | 5/2017 | |
| JP | 2018-054012 A | 4/2018 | |
| JP | 2018-059572 A | 4/2018 | |
| WO | WO-2014087070 A1 * | 6/2014 | ............. F16D 55/00 |

* cited by examiner

Primary Examiner — Thomas J Williams
(74) Attorney, Agent, or Firm — Sughrue Mion, PLLC

(57) ABSTRACT

A brake dust cover is disposed between a non-rotating body rotatably supporting an axle and a disc rotor rotating together with the axle so as to cover the disc rotor from an inner side in a vehicle width direction. The brake dust cover includes a first plate-like member having a C-shape in which a part of a circular ring is cut out, and a second plate-like member coupled to the first plate-like member. The second plate-like member includes a fixed portion fixed to the non-rotating body, and a plurality of support portions extending radially from the fixed portion. The first plate-like member is coupled to the second plate-like member to overlap the support portions such that an opening portion is formed between an inner edge of the first plate-like member and an outer edge of the fixed portion of the second plate-like member when viewed in the vehicle width direction.

10 Claims, 6 Drawing Sheets

BRAKE DUST COVER

INCORPORATION BY REFERENCE

The disclosure of Japanese Patent Application No. 2018-191646 filed on Oct. 10, 2018 including the specification, drawings and abstract is incorporated herein by reference in its entirety.

BACKGROUND

1. Technical Field

The present disclosure relates to a brake dust cover for a disc brake device that is provided at a wheel of a vehicle.

2. Description of Related Art

In the past, it has been widely performed to cover the inside of a disc rotor of a disc brake device with a brake dust cover in order to suppress infiltration of dust or foreign matter from the inner side of a vehicle to the disc rotor.

In this type of brake dust cover, a technique in which an opening portion is provided in the brake dust cover itself and the disc rotor is cooled by air for brake cooling introduced from the outside through the opening portion is known (refer to, for example, Japanese Unexamined Patent Application Publication No. 2018-059572 (JP 2018-059572 A)).

SUMMARY

Incidentally, a case where a brake is used under a more severe condition is increasing according to an easy increase in vehicle speed due to recent improvement in power performance, and thus further improvement in brake cooling performance is demanded in order to suppress a fade (a decrease in braking force due to overheating of the disc rotor) without increasing the size of the disc rotor in order to reduce the vehicle body weight.

Therefore, in order to increase the introduction amount of air for brake cooling, it is conceivable to provide the brake dust cover with a relatively large opening portion, rather than a relatively small opening portion as in JP 2018-059572 A described above.

However, in a case where the relatively large opening portion is provided in the brake dust cover, there is a problem in that it becomes difficult to secure the strength of the brake dust cover.

Therefore, in order to secure the strength of the brake dust cover, it is conceivable to relatively thicken the plate thickness of the brake dust cover. However, in this case, there is a problem in that the vehicle body weight increases and fuel efficiency deteriorates.

The present disclosure provides a brake dust cover in which it is possible to achieve both improvement in brake cooling performance and suppression of deterioration of fuel efficiency while the strength thereof is secured.

In a brake dust cover according to an aspect of the present disclosure, the brake dust cover is configured by making a plate-like member for suppressing infiltration of foreign matter or the like and a plate-like member for imparting strength overlap each other such that an opening portion is formed between both the plate-like members.

Specifically, an aspect of the present disclosure relates to a brake dust cover. The brake dust cover is disposed between a non-rotating body rotatably supporting an axle of a vehicle and a disc rotor rotating together with the axle so as to cover the disc rotor from an inner side in a vehicle width direction of the vehicle.

The brake dust cover includes a first plate-like member having a C-shape in which a part of a circular ring is cut out, and a second plate-like member that is coupled to the first plate-like member. The second plate-like member includes a fixed portion that is fixed to the non-rotating body, and a plurality of support portions extending radially from the fixed portion, and the first plate-like member is coupled to the second plate-like member to overlap the support portions such that an opening portion is formed between an inner edge of the first plate-like member and an outer edge of the fixed portion of the second plate-like member when viewed in the vehicle width direction of the vehicle.

According to the aspect of the present disclosure, by making a location where a part of a circular ring is cut out, in the C-shaped first plate-like member, coincide with a caliper of the existing disc brake device, it is possible to suppress infiltration of foreign matter or the like without interfering with the caliper.

The first plate-like member overlaps the support portions such that an opening portion is formed between an inner edge of the first plate-like member and an outer edge of the fixed portion of the second plate-like member when viewed in the vehicle width direction of the vehicle, and therefore, it is possible to introduce air for brake cooling from the opening portion, whereby it is possible to improve the brake cooling performance.

Moreover, the two plate-like members overlap each other, and therefore, even though the opening portion is set to be relatively large, it is possible to secure the strength of the brake dust cover.

In addition, by combining the first plate-like member and the second plate-like member which are different in shape from each other, in other words, by limiting a portion which becomes thick by being overlapped, it is possible to suppress an increase in vehicle body weight, compared to a brake dust cover that is thick as a whole, whereby it is possible to suppress deterioration of fuel efficiency.

With the above, according to the aspect of the present disclosure, it is possible to achieve both improvement in brake cooling performance and suppression of deterioration of fuel efficiency while the strength of the brake dust cover is secured.

In the brake dust cover according to the aspect of the present disclosure, a plate thickness of the second plate-like member may be thicker than a plate thickness of the first plate-like member.

According to the aspect of the present disclosure, a portion (fixed portion) that is fixed to the non-rotating body is configured in the relatively thick second plate-like member, and therefore, for example, even in a case of adopting a structure in which the fixed portion is sandwiched between the non-rotating body and a hub bearing or the like, it is possible to secure the strength of the fixed portion on which a force (excitation force) easily acts at the time of resonance of the brake dust cover.

By combining the relatively thin first plate-like member and the relatively thick second plate-like member, it is possible to suppress an increase in vehicle body weight, compared to a brake dust cover that is thick as a whole.

In the brake dust cover according to the aspect of the present disclosure, the first plate-like member may include a protruding bead, the second plate-like member may include a lightening hole that is disposed at the support portion, and the first plate-like member may overlap the support portions such that the protruding bead overlaps the lightening hole.

According to the aspect of the present disclosure, the second plate-like member includes the lightening hole that is disposed at the support portion, and therefore, it is possible to even further suppress an increase in vehicle body weight. However, when such a lightening hole is disposed at the support portion, the strength of the support portion itself is reduced.

In this respect, in the aspect of the present disclosure, the first plate-like member overlaps the support portions such that the protruding bead provided in the first plate-like member overlaps the lightening hole, whereby a decrease in the strength of the support portion itself can be compensated by the protruding bead. Therefore, it is possible to even further reduce the weight of the brake dust cover while a decrease in strength is suppressed.

In the brake dust cover according to the aspect of the present disclosure, the fixed portion may include a through-opening portion that penetrates in the vehicle width direction of the vehicle.

According to the aspect of the present disclosure, air for brake cooling can be introduced not only from the opening portion between the inner edge of the first plate-like member and the outer edge of the fixed portion of the second plate-like member but also from the through-opening portion formed in the fixed portion, and therefore, it is possible to even further improve the brake cooling performance.

In the brake dust cover according to the aspect of the present disclosure, the support portions may extend in at least four directions.

According to the aspect of the present disclosure, the support portions radially extend in at least four directions, and therefore, turning deformation from the top and bottom and the front and back of the first plate-like member at the time of resonance can be suppressed by four or more support portions that radially extend.

In the brake dust cover according to the aspect of the present disclosure, it is possible to achieve both improvement in brake cooling performance and suppression of deterioration of fuel efficiency while the strength of the brake dust cover is secured.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
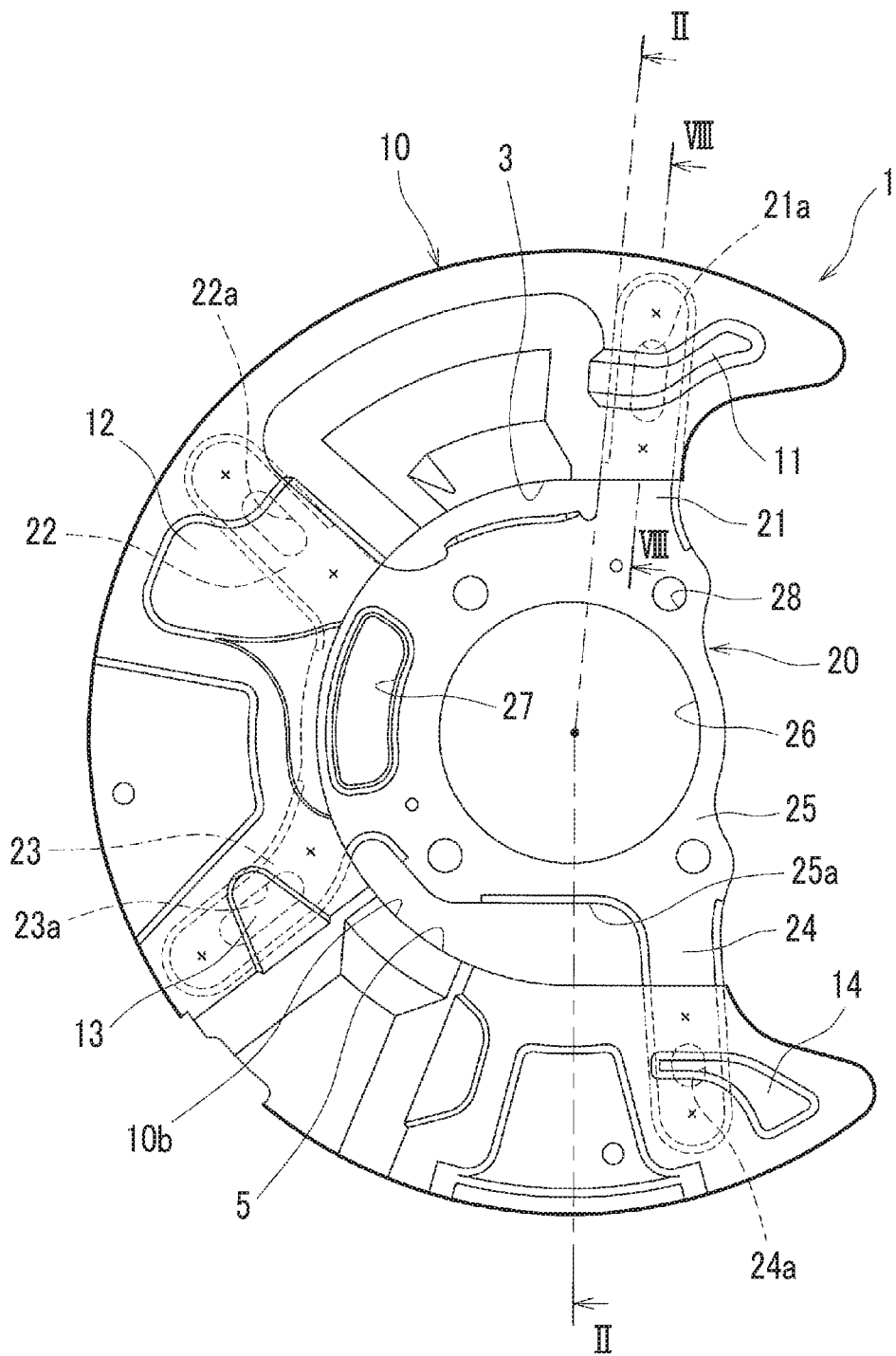
FIG. 1 is a front view schematically showing a brake dust cover according to an embodiment of the present disclosure.

Hereinafter, an embodiment for carrying out the present disclosure will be described based on the drawings.

In this embodiment, a case will be described where the present disclosure is applied to a disc brake device that includes a disc rotor 31 connected to an axle 30, which is rotatably supported by a knuckle 33 that is a non-rotating body through a hub bearing 34 having bearing balls 34a, through a hub 35, and calipers 32 that are disposed so as to interpose both sides of the disc rotor 31 therebetween (refer to FIGS. 3A and 3B). The front views of FIGS. 1, 4, and 6 correspond to diagrams showing a brake dust cover 1, a first plate-like member 10, and a second plate-like member 20, respectively, as viewed from the inner side in a vehicle width direction of a vehicle.

Figure 2:
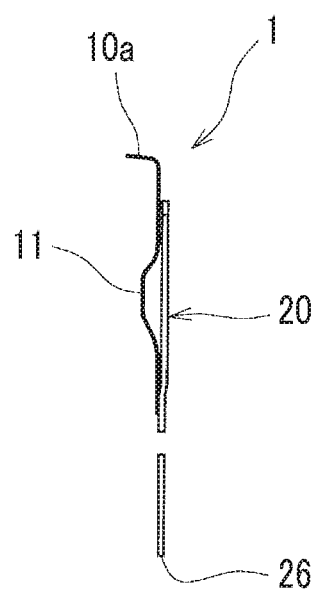
FIG. 2 is a sectional view taken along line II-II of FIG. 1.
Figure 2:
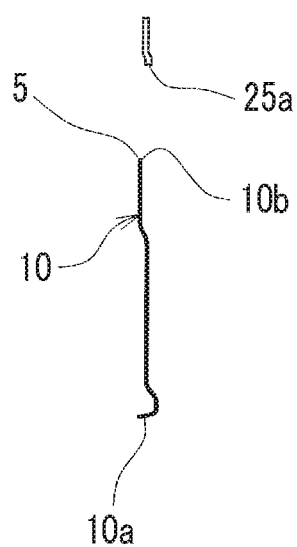

FIG. 1 is a front view schematically showing the brake dust cover 1 according to this embodiment, and FIG. 2 is a sectional view taken along line II-II of FIG. 1 and viewed in a direction of an arrow. FIG. 3A is a diagram schematically showing a state where the brake dust cover 1 is mounted to a wheel of a vehicle, as viewed from the inner side in the vehicle width direction of the vehicle, and FIG. 3B is a diagram schematically describing a method of fixing the brake dust cover 1. The brake dust cover 1 is disposed between the knuckle (non-rotating body) 33 rotatably supporting the axle 30 of the vehicle and the disc rotor 31 rotating together with the axle 30 so as to cover the disc rotor 31 from the inner side in the vehicle width direction of the vehicle, as shown in FIGS. 3A and 3B. The brake dust cover 1 is configured by spot-welding (refer to x marks in FIG. 1) the first plate-like member 10 that is relatively thin in plate thickness and is disposed on the inner side in the vehicle width direction of the vehicle, and the second plate-like member 20 that is relatively thick in plate thickness and is disposed on the outer side in the vehicle width direction of the vehicle, with the first plate-like member 10 and the second plate-like member 20 overlapping each other in the vehicle width direction of the vehicle, as shown in FIGS. 1 and 2.

Figure 4:
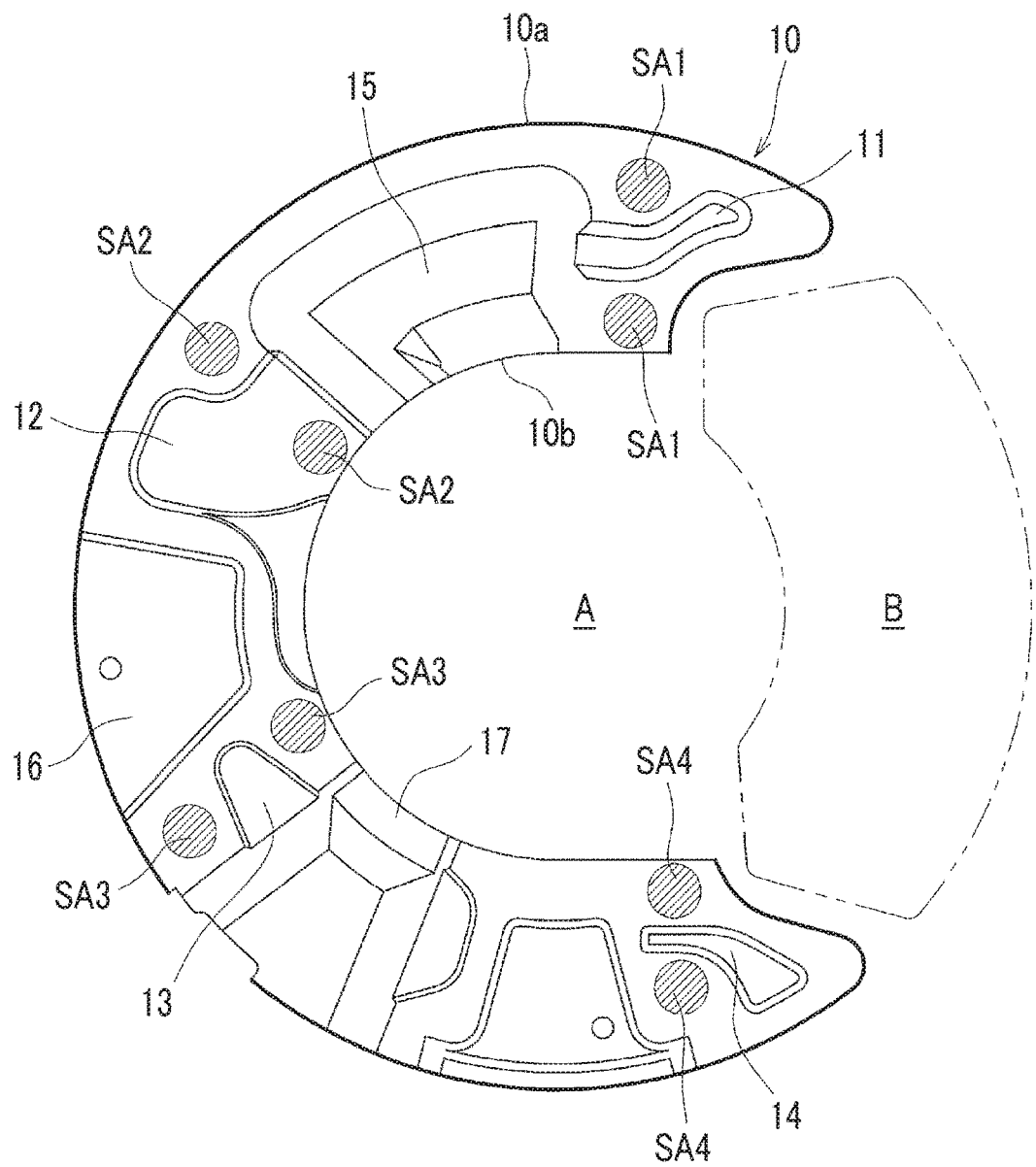
FIG. 4 is a front view schematically showing a first plate-like member.
Figure 5:
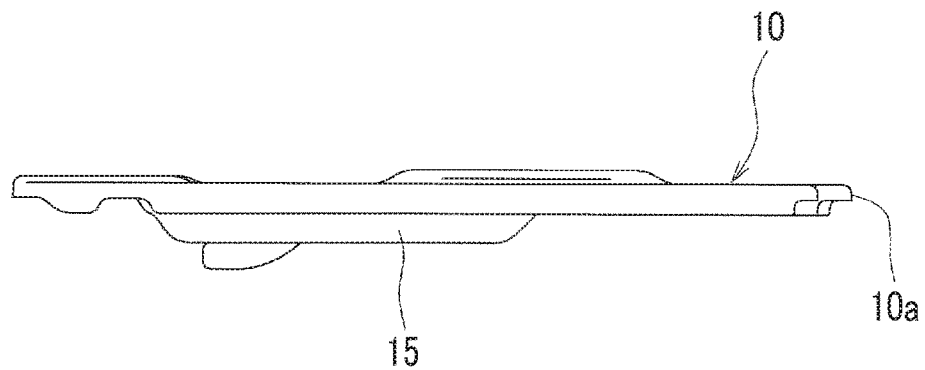
FIG. 5 is a side view schematically showing the first plate-like member.

FIG. 4 is a front view schematically showing the first plate-like member 10, and FIG. 5 is a side view schematically showing the first plate-like member 10. Shaded portions SA1 to SA4 in FIG. 4 show locations scheduled to be spot-welded to the second plate-like member 20. The first plate-like member 10 is a member having a C-shape in which a part of a circular ring is cut out, as shown in FIG. 4, and is formed relatively thin (for example, 0.7 mm). In this manner, the first plate-like member 10 is formed in a C-shape, so that a fixed portion 25 of the second plate-like member 20 (described later) is located inside A of an inner edge 10b and the caliper 32 is located within a location B where a part of the circular ring is cut out.

The first plate-like member 10 has an outer peripheral edge portion 10a bent to the inner side in the vehicle width direction of the vehicle, as shown in FIGS. 2 and 5, so that wind from the inner side of the vehicle is directed to the center of the brake dust cover 1 without escaping to increase air for brake cooling.

As shown in FIGS. 4 and 5, the first plate-like member 10 is formed with a large number of irregularities 15, 16, 17, so that the strength thereof is enhanced. In particular, first to fourth protruding beads 11, 12, 13, 14 protruding to the inner side in the vehicle width direction of the vehicle are formed in the vicinity of the four spot-welding scheduled locations SA1, SA2, SA3, SA4, respectively.

Figure 6:
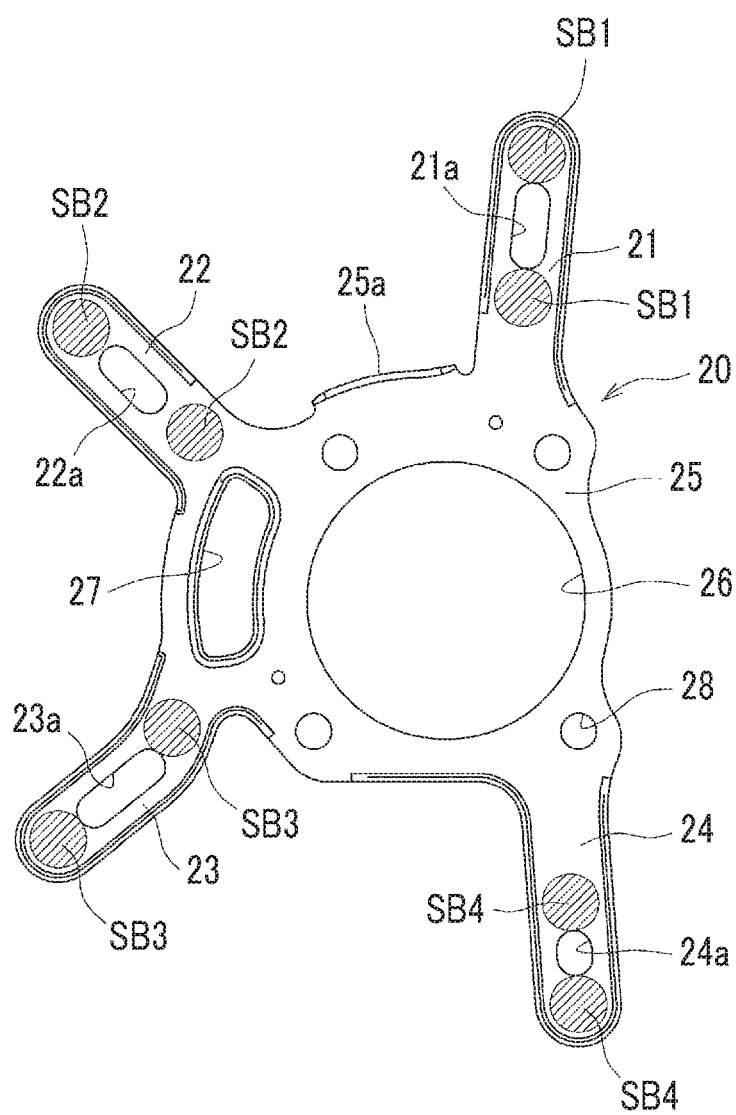
FIG. 6 is a front view schematically showing a second plate-like member.
Figure 7:
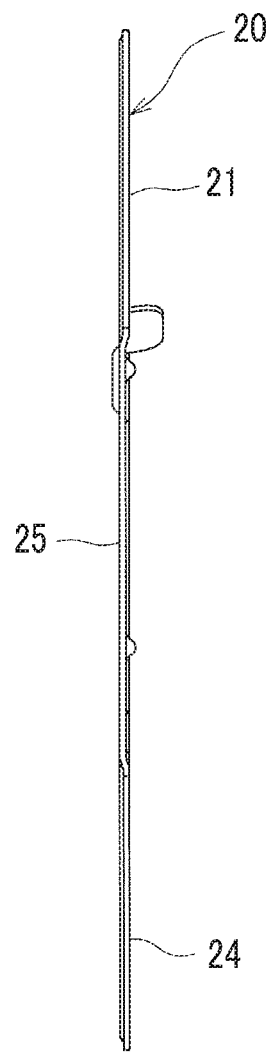
FIG. 7 is a side view schematically showing the second plate-like member.

FIG. 6 is a front view schematically showing the second plate-like member 20, and FIG. 7 is a side view schematically showing the second plate-like member 20. Shaded portions SB1 to SB4 in FIG. 6 show locations scheduled to be spot-welded to the first plate-like member 10, corresponding to the spot-welding scheduled locations SA1 to SA4. The second plate-like member 20 has the fixed portion 25 located at the center thereof, and first to fourth support portions 21, 22, 23, 24 extending outward from the fixed portion 25, as shown in FIG. 6, and is formed thicker (for example, 1.8 mm) than the first plate-like member 10. In this manner, the second plate-like member 20 is formed relatively thick, so that the strength thereof is enhanced due to the plate thickness, and therefore, as can be seen by comparing FIG. 5 with FIG. 7, unlike the first plate-like member 10, the second plate-like member 20 is formed in a flat shape which hardly has undulations.

A circular through-hole 26 is formed at the central portion of the fixed portion 25, and four bolt holes 28 are formed at intervals of approximately 90 degrees on the circumference concentric with the through-hole 26 in a peripheral portion of the through-hole 26. As shown in FIG. 3A, the axle 30, the hub 35, and the hub bearing 34 are inserted into the through-hole 26 in a state where the brake dust cover 1 is mounted on the vehicle. On the other hand, a bolt 36 for fixing the hub bearing 34 to the knuckle 33 is inserted into each of the bolt holes 28, as shown in FIG. 3B. A through-opening portion 27 penetrating in the vehicle width direction of the vehicle is formed in a portion on the rear side in a vehicle front-rear direction (near the second support portion 22 and the third support portion 23) in the fixed portion 25, as shown in FIG. 6.

The first support portion 21 extends upward from the fixed portion 25. The second support portion 22 extends obliquely upward as it goes from the fixed portion 25 to the rear. The third support portion 23 extends obliquely downward as it goes from the fixed portion 25 to the rear. The fourth support portion 24 extends downward from the fixed portion 25. In this manner, the four support portions 21, 22, 23, 24 extend radially from the fixed portion 25.

As shown in FIG. 6, first to fourth lightening holes 21a, 22a, 23a, 24a are respectively formed in the first to fourth support portions 21, 22, 23, 24. More specifically, in the first support portion 21, the first lightening hole 21a having an oval shape is formed to penetrate the first support portion 21 between the two spot-welding scheduled locations SB1. In the second support portion 22, the second lightening hole 22a having an oval shape is formed to penetrate the second support portion 22 between the two spot-welding scheduled locations SB2. In the third support portion 23, the third lightening hole 23a having an oval shape is formed to penetrate the third support portion 23 between the two spot-welding scheduled locations SB3. In the fourth support portion 24, the fourth lightening hole 24a having an oval shape is formed to penetrate the fourth support portion 24 between the two spot-welding scheduled locations SB4.

Figure 8:
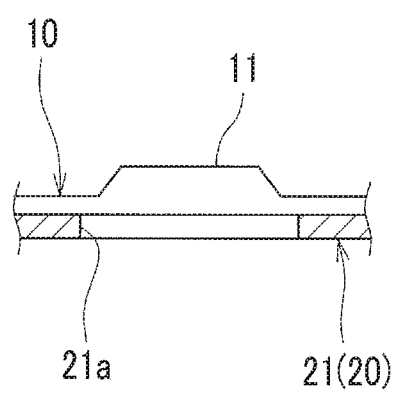
FIG. 8 is a sectional view taken along line VIII-VIII of FIG. 1.

In the first plate-like member 10 and the second plate-like member 20 configured as described above, as shown in FIG. 1, the first plate-like member 10 overlaps the first to fourth support portions 21, 22, 23, 24 of the second plate-like member 20 from the inner side in the vehicle width direction such that the fixed portion 25 of the second plate-like member 20 is located inside A of the inner edge 10b of the first plate-like member 10 when viewed from the vehicle width direction of the vehicle and a first opening portion 3 and a second opening portion 5 are formed between the inner edge 10b of the first plate-like member 10 and an outer edge 25a of the fixed portion 25 of the second plate-like member 20. Moreover, the first plate-like member 10 overlaps the first to fourth support portions 21, 22, 23, 24 such that the first protruding bead 11 overlaps the first lightening hole 21a, as shown in FIG. 8, the second protruding bead 12 overlaps the second lightening hole 22a, the third protruding bead 13 overlaps the third lightening hole 23a, and the fourth protruding bead 14 overlaps the fourth lightening hole 24a.

In this way, the spot-welding scheduled locations SA1 to SA4 are respectively spot-welded to the spot-welding scheduled locations SB1 to SB4, whereby the brake dust cover 1 is formed by the relatively thin first plate-like member 10 that is disposed inside in the vehicle width direction and the relatively thick second plate-like member 20 that is disposed outside in the vehicle width direction.

The brake dust cover 1 is fixed to the knuckle 33 at the fixed portion 25 of the second plate-like member 20. More specifically, as shown in FIG. 3B, four through-holes 33a which are not threaded are formed in the knuckle 33, and on the other hand, four bolt holes 34b which are threaded are formed in the hub bearing 34. In this way, the bolt 36 inserted in the order of the through-hole 33a of the knuckle 33 and the bolt hole 28 of the fixed portion 25 is screwed to the bolt hole 34b of the hub bearing 34 from the inner side in the vehicle width direction, whereby the hub bearing 34 is fixed to the knuckle 33. In this way, the fixed portion 25 is fixed to the knuckle 33 in a form of being sandwiched between the knuckle 33 and the hub bearing 34.

The axle 30, which is rotatably supported by the knuckle 33 through the hub bearing 34 fixed to the knuckle 33, and the hub 35 are connected to the disc rotor 31 through the through-hole 26 of the fixed portion 25 outside in the vehicle width direction. In this way, the brake dust cover 1 is disposed between the knuckle 33 and the disc rotor 31 so as to cover the disc rotor 31 from the inner side in the vehicle width direction, as shown in FIG. 3A.

With the brake dust cover 1 of this embodiment configured and disposed as described above, by making the location B where a part of the circular ring is cut out, in the C-shaped first plate-like member 10, coincide with the caliper 32 of the existing disc brake device, it is possible to suppress infiltration of foreign matter or the like without interfering with the caliper 32.

Figure 3A:
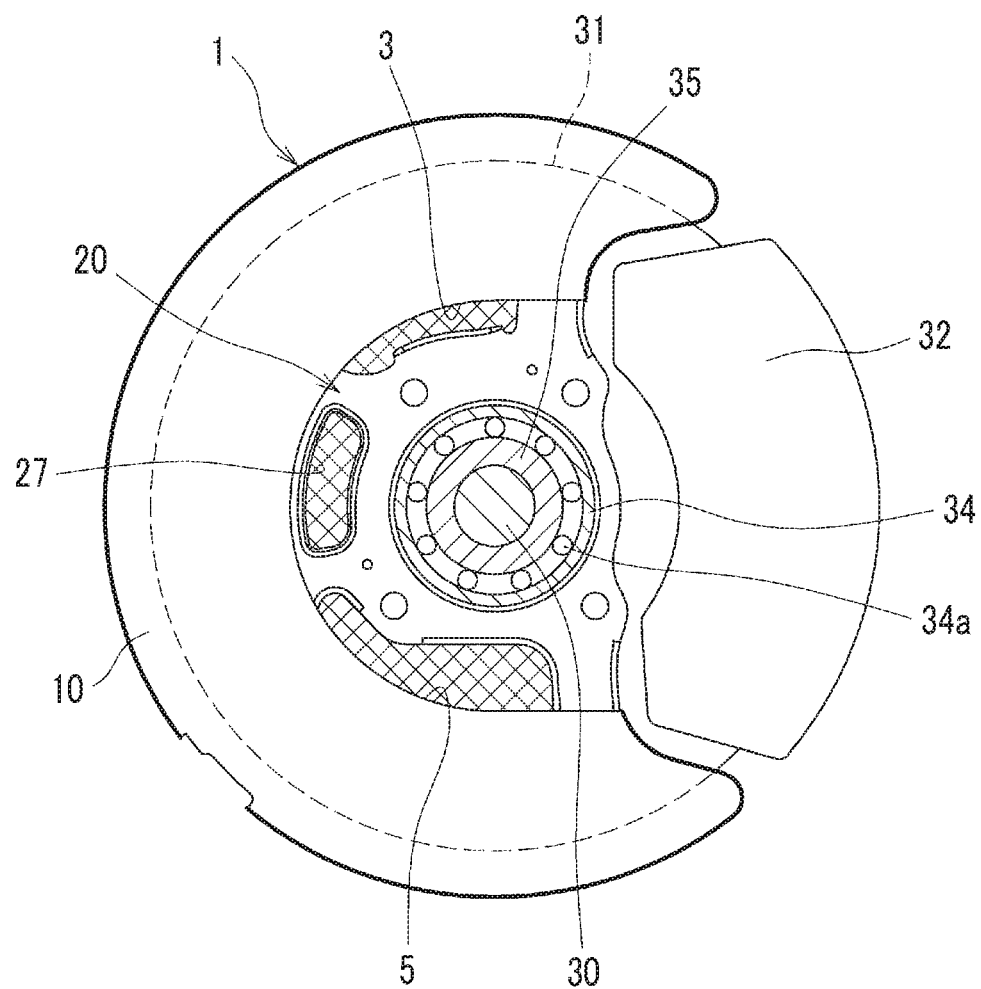
FIG. 3A is a diagram schematically showing a state where the brake dust cover is mounted to a wheel of a vehicle, as viewed from the inner side in a vehicle width direction of the vehicle.
Figure 3B:
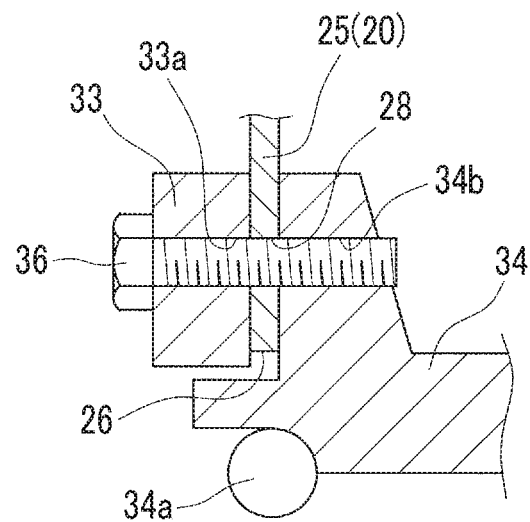
FIG. 3B is a diagram schematically describing a method of fixing the brake dust cover.

The first plate-like member 10 overlaps the first to fourth support portions 21, 22, 23, 24 such that the first opening portion 3 and the second opening portion 5 are formed as shown by cross hatching portions in FIG. 3A. Therefore, it is possible to introduce air for brake cooling from the first opening portion 3 and the second opening portion 5, whereby it is possible to improve the brake cooling performance. Moreover, the relatively thick second plate-like member 20 overlaps the first plate-like member 10, and therefore, even though the first opening portion 3 and the second opening portion 5 are set to be relatively large, it is possible to secure the strength of the brake dust cover 1.

In addition, it is possible to introduce the air for brake cooling to the disc rotor 31 not only from the first opening portion 3 and the second opening portion 5 but also from the through-opening portion 27 formed in the fixed portion 25, and therefore, it becomes possible to even further improve the brake cooling performance.

By combining the relatively thin first plate-like member 10 and the relatively thick second plate-like member 20, it is possible to suppress an increase in vehicle body weight, compared to a brake dust cover that is thick as a whole, and thus it is possible to suppress deterioration of fuel efficiency.

In addition, in the relatively thick second plate-like member 20, the first to fourth lightening holes 21a, 22a, 23a, 24a are respectively formed in the first to fourth support portions 21, 22, 23, 24, and therefore, it is possible to even further suppress an increase in vehicle body weight. In a case where the lightening holes 21a, 22a, 23a, 24a are formed, the strength of the support portions 21, 22, 23, 24 themselves decreases. However, due to making the first plate-like member 10 overlap the first to fourth support portions 21, 22, 23, 24 such that the first to fourth protruding beads 11, 12, 13, 14 respectively overlap the first to fourth lightening holes 21a, 22a, 23a, 24a, a decrease in strength of the support portions 21, 22, 23, 24 themselves can be compensated by the first to fourth protruding beads 11, 12, 13, 14. Therefore, it is possible to even further reduce the weight of the brake dust cover 1 while a decrease in strength is suppressed.

Moreover, the first plate-like member 10 having the first to fourth protruding beads 11, 12, 13, 14 protruding to the inner side in the vehicle width direction overlaps the first to fourth support portions 21, 22, 23, 24 from the inner side in the vehicle width direction, and therefore, it is possible to suppress interference of the first to fourth protruding beads 11, 12, 13, 14 with the disc rotor 31.

Incidentally, when the wheels shake in a case where the vehicle on which the brake dust cover 1 is mounted travels on, for example, a rough road, the brake dust cover 1 resonates, and thus it is also assumed that deformation such as an upper portion of the relatively thin first plate-like member 10 being turned downward, a rear portion being turned forward, or a lower portion being turned upward occurs. However, in the brake dust cover 1 of this embodiment, the first to fourth support portions 21, 22, 23, 24 radially extend in four directions, and therefore, even though the first plate-like member 10 is tried to be turned in any aspect, the turning deformation of the first plate-like member 10 can be suppressed by the relatively thick first to fourth support portions 21, 22, 23, 24. Specifically, the turning deformation of the upper portion of the first plate-like member 10 can be suppressed by the first and second support portions 21, 22, the turning deformation of the rear portion can be suppressed by the second and third support portions 22, 23, and the turning deformation of the lower portion can be suppressed by the third and fourth support portions 23, 24.

In the structure in which the fixed portion 25 is sandwiched between the knuckle 33 and the hub bearing 34, when the brake dust cover 1 resonates, a large force (excitation force) acts on the sandwiched portion. However, the fixed portion 25 that is the sandwiched portion is configured in the relatively thick second plate-like member 20, and therefore, deformation or the like of the fixed portion 25 at the time of resonance can be suppressed.

With the above, with the brake dust cover 1 of this embodiment, it is possible to achieve both improvement in brake cooling performance and suppression of deterioration of fuel efficiency while the strength thereof is secured.

Other Embodiments

An applicable embodiment of the present disclosure is not limited to the embodiment and can be implemented in other various forms without departing from the spirit or main features of the present disclosure.

In the embodiment described above, the lightening holes 21a, 22a, 23a, 24a are formed one by one in the respective support portions 21, 22, 23, 24. However, there is no limitation thereto, and for example, a lightening hole may not be formed in the support portion, and a lightening hole may be formed solely in some of the support portions.

As long as the protruding bead overlaps the lightening hole, for example, a plurality of lightening holes may be formed in each support portion.

In the embodiment described above, as introduction ports for the air for brake cooling, the first opening portion 3 is formed between the first support portion 21 and the second support portion 22, the second opening portion 5 is formed between the third support portion 23 and the fourth support portion 24, and the through-opening portion 27 is formed in the fixed portion 25. However, there is no limitation thereto, and for example, the first plate-like member 10 may overlap the first to fourth support portions 21, 22, 23, 24 such that a third opening portion is formed between the second support portion 22 and the third support portion 23 with the through-opening portion 27 omitted.

The through-opening portion 27 of the second plate-like member 20 may be omitted, and a through-opening portion as an introduction port for the air for brake cooling may be formed in, for example, the first plate-like member 10.

In the embodiment described above, the four support portions 21, 22, 23, 24 extend radially from the fixed portion 25. However, there is no limitation thereto, and for example, five or more support portions may extend radially from the fixed portion 25.

In the embodiment described above, the brake dust cover 1 is formed using the first plate-like member 10 having a relatively thin plate thickness and the second plate-like member 20 having a relatively thick plate thickness. However, there is no limitation thereto, and for example, the brake dust cover may be formed using a first plate-like member and a second plate-like member having the same plate thickness.

In this manner, the embodiments described above are merely exemplification in every respect and are not to be construed to a limited extent. All modifications or changes that fall within the equivalent scope of the claims fall within the scope of the present disclosure.

According to the embodiment of the present disclosure, since it is possible to achieve both improvement in brake cooling performance and suppression of deterioration of fuel efficiency while strength is secured, the embodiments of the present disclosure are extremely useful for application to a brake dust cover for a disc brake device that is provided at a wheel of a vehicle.

What is claimed is:

1. A brake dust cover that is disposed between a non-rotating body rotatably supporting an axle of a vehicle and a disc rotor rotating together with the axle so as to cover the disc rotor from an inner side in a vehicle width direction of the vehicle, the brake dust cover comprising:
   a first plate member having a plate shape and a C-shape in which a part of a circular ring is cut out; and
   a second plate member that is coupled to the first plate member, the second plate member having a plate shape, wherein:
   the second plate member includes a fixed portion that is fixed to the non-rotating body, and a plurality of support portions extending radially from the fixed portion;

the first plate member is coupled to the second plate member to overlap the support portions such that an opening portion is formed between an inner edge of the first plate member and an outer edge of the fixed portion of the second plate member when viewed in the vehicle width direction of the vehicle;

the first plate member includes a protruding bead;

the second plate member includes a lightening hole that is disposed at the support portion; and the first plate member overlaps the support portions such that the protruding bead overlaps the lightening hole.

2. The brake dust cover according to claim 1, wherein a plate thickness of the second plate member is thicker than a plate thickness of the first plate member.

3. The brake dust cover according to claim 1, wherein the fixed portion includes a through-opening portion that penetrates in the vehicle width direction of the vehicle.

4. A brake dust cover that is disposed between a non-rotating body rotatably supporting an axle of a vehicle and a disc rotor rotating together with the axle so as to cover the disc rotor from an inner side in a vehicle width direction of the vehicle, the brake dust cover comprising:

a first plate member having a plate shape and a C-shape in which a part of a circular ring is cut out; and a second plate member that is coupled to the first plate member, the second plate member having a plate shape, wherein:

the second plate member includes a fixed portion that is fixed to the non-rotating body, and a plurality of support portions extending radially from the fixed portion;

the first plate member is coupled to the second plate member to overlap the support portions such that an opening portion is formed between an inner edge of the first plate member and an outer edge of the fixed portion of the second plate member when viewed in the vehicle width direction of the vehicle, and the support portions extend in at least four directions.

5. The brake dust cover according to claim 4, wherein a plate thickness of the second plate member is thicker than a plate thickness of the first plate member.

6. The brake dust cover according to claim 4, wherein the fixed portion includes a through-opening portion that penetrates in the vehicle width direction of the vehicle.

7. A brake dust cover that is disposed between a non-rotating body rotatably supporting an axle of a vehicle and a disc rotor rotating together with the axle so as to cover the disc rotor from an inner side in a vehicle width direction of the vehicle, the brake dust cover comprising:

a first plate member having a plate shape and a C-shape in which a part of a circular ring is cut out; and a second plate member that is coupled to the first plate member, the second plate member having a plate shape, wherein:

the second plate member includes a fixed portion that is fixed to the non-rotating body, and a plurality of support portions extending radially from the fixed portion;

the first plate member is coupled to the second plate member to overlap the support portions such that an opening portion is formed between an inner edge of the first plate member and an outer edge of the fixed portion of the second plate member when viewed in the vehicle width direction of the vehicle; and the first plate member is coupled to the second plate member to overlap the support portions such that the opening portion is formed between the adjacent support portions when viewed in the vehicle width direction of the vehicle.

8. The brake dust cover according to claim 7, wherein the opening portion is a closed space that is defined by the inner edge of the first plate member and the outer edge of the fixed portion of the second plate member when viewed in the vehicle width direction of the vehicle.

9. The brake dust cover according to claim 7, wherein a plate thickness of the second plate member is thicker than a plate thickness of the first plate member.

10. The brake dust cover according to claim 7, wherein the fixed portion includes a through-opening portion that penetrates in the vehicle width direction of the vehicle.

* * * * *